United States Patent Office 3,510,158
Patented May 5, 1970

3,510,158
MOVING SYSTEM OF A PRECISION GEAR
Viktor Ivanovich Efimenko, Ul. Vystavochnaya 3, kv. 17, and Vladimir Fedorovich Tynchenko, Mekhanicheskaya 18, kv. 37, both of Krasnodar, U.S.S.R.
Filed Jan. 12, 1968, Ser. No. 697,366
Int. Cl. F16d 1/08
U.S. Cl. 287—52.07      3 Claims

ABSTRACT OF THE DISCLOSURE

A moving system of an electrical measuring instrument, comprises a supporting spindle coupled to a moving element, the spindle being essentially a hollow tubular structure and having specially profiled ends. A brace extends the whole length of the spindle and is disposed centrally with respect to the latter, due to the profiled ends, for securing the moving portion in stationary supports. The brace is secured to the spindle by means of wedges located inside the tubular spindle, each wedge having a longitudinal projection which in combination with the profile of the spindle secures the brace in place. The wedge may be provided with a cross projection to separate the brace inner portion from the outer one which is subject to twisting during spindle turning and the spindle may have one or more holes to provide access to the brace inner portion to enable securing the brace to the spindle.

---

The present invention relates to moving systems used in precision gears or mechanisms, mostly to moving elements of electro-mechanical measuring instruments.

Known in the art are moving systems of electrical measuring instruments comprising a supporting spindle fixed at both ends by ties or braces, usually separate ones, which are held to slotted clamping heads.

Said moving systems are rather complicated in manufacture and assembly and fail to provide a strictly central position of a moving part with respect to the axis of rotation thereof.

In view of the above-stated problems the invention has for its object to provide a movable system, wherein any possibility for said braces or ties to be arranged eccentrically is completely ruled out.

Another object of the present invention is to provide a moving system simple in design and easy to manufacture and assemble.

A specific object of the present invention is to provide a moving system incorporating elements capable of keeping said brace or tie in a central position.

Said object is accomplished due to the fact that in a system, according to the invention, a supporting spindle of a tubular type has at both ends specially shaped or profiled portions with guide grooves provided therein to center a solid through brace with respect to the longitudinal axis of said tubular spindle, as well as with channels or recesses to accommodate butt wedges which lock said brace in place in said grooves. The aforesaid wedges are expedient to have a crosswise projection adapted to be encompassed by said brace and to separate the outer effective portion thereof from its inner portion.

Provision may be made in the central portion of said tubular spindle for a hole, through which the inner portion of said brace is made fast thereto.

Figure 1:
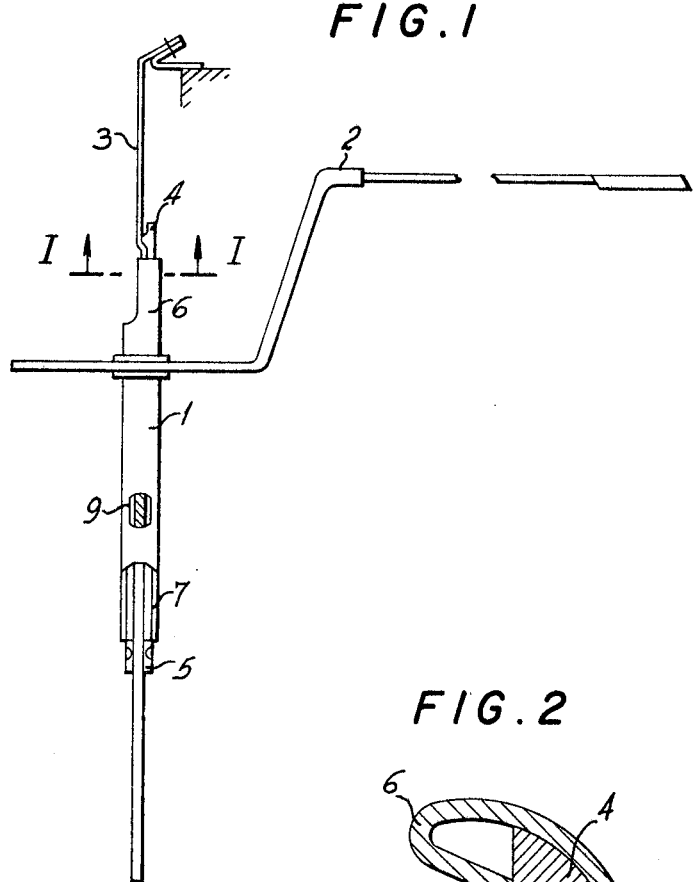
Figure 2:
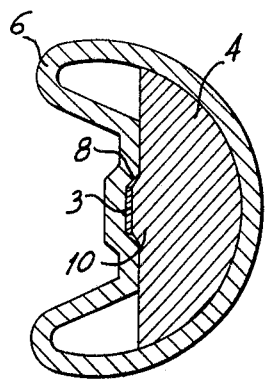
Figure 3:
Figure 4:
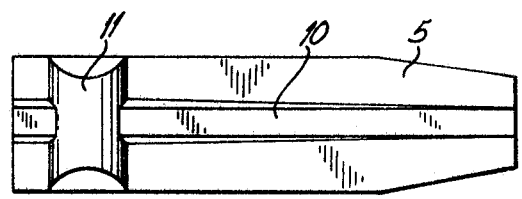

An embodiment of the present invention is described hereinbelow by way of example with reference to the accompanying drawings, wherein:

FIG. 1 is an elevation view of a moving system of a precision gear, according to the invention;
FIG. 2 is a section taken on the line I—I of FIG. 1;
FIG. 3 is a side elevation of the locking wedge in the moving system of FIG. 1; and
FIG. 4 is a plan view of the wedge in FIG. 3.

Now referring to FIG. 1, a supporting spindle 1 of the herein-disclosed moving system is essentially a hollow tube, carrying a pointer 2 of the measuring instrument involved.

A solid brace 3 runs through the bore of the tubular spindle and is fixed at the ends thereof by means of locking wedges 4 and 5. Specially shaped or profiled portions 6 and 7 are provided at the ends of the tubular spindle 1 to form grooves 8 (FIG. 2) for the brace 3 to lay therein.

The wedges 4 and 5 are fitted into the vacant channels or recesses provided at the end faces of the spindle 1 to tightly lock the brace 3 in place in the grooves 8.

A hole 9 may be provided in the central portion of the tubular spindle 1 for gaining access to the inner portion of the brace moving along the brace 3 by possible impact loads.

The locking wedges 4 and 5 are each provided with a longitudinal projection 10 (FIGS. 2, 3 and 4) which forces the brace against the bottom of the groove 8, and with a crosswise projection 11 (FIGS. 3, 4 and 5) adapted to be encompassed by the brace 3 and to separate the outer effective portions thereof which are fastened to holders 11, from its inner portion.

The spindle 1 may be made either as an integral metal tube or as a ceramic tube with shaped end-pieces.

The movable system of the invention disclosed hereinabove is very simple in manufacture and assembly, and enables the brace to be held in a strictly central position with respect to the axis of rotation of the system involved.

What is claimed is:
1. A movable system for a precision measuring instrument, said system comprising: a movable element; a supporting spindle coupled to said movable element, said spindle being essentially constituted as a hollow tubular structure reduced in cross-section at each end so as to provide a profiled portion at each end thereof, said portions having guide grooves therein; a solid brace extending through said spindle and engaged in said guide grooves; wedges located in the profiled portions of the spindle and including longitudinal projections extending in said guide grooves to tightly lock the brace in place in said guide grooves; and means for securing the outer ends of said brace and freely suspending said spindle and the moving element therewith.
2. A moving system as claimed in claim 1 wherein the wedges each include a crosswise projection adapted to be encompassed by the brace to separate the outer effective portions thereof from its inner portion.
3. A moving system as claimed in claim 1 wherein a hole is provided in the central portion of the tubular spindle to furnish access to the brace and enable additional securing of the brace to the spindle.

References Cited

UNITED STATES PATENTS

| 610,576 | 9/1898 | Auger | 287—52.05 XR |
| 1,891,405 | 12/1932 | Ericksson | 287—52.07 XR |

DAVID J. WILLIAMOWSKY, Primary Examiner
A. KUNDRAT, Assistant Examiner

U.S. Cl. X.R.
116—136.5